(12) United States Patent
Ahmad et al.

(10) Patent No.: US 9,258,685 B2
(45) Date of Patent: Feb. 9, 2016

(54) LIGHTING CONTROLLER WITH INTEGRATED WIDE AREA NETWORK INTERFACE

(71) Applicant: Dialight Corporation, Farmingdale, NJ (US)

(72) Inventors: Rizwan Ahmad, Summit, NJ (US); David L. Bueno, Pueblo, CO (US); Cameron L. Harvey, Rye, CO (US)

(73) Assignee: Dialight Corporation, Farmingdale, NJ (US)

( * ) Notice: Subject to any disclaimer, the term of this patent is extended or adjusted under 35 U.S.C. 154(b) by 0 days.

(21) Appl. No.: 13/732,095

(22) Filed: Dec. 31, 2012

(65) Prior Publication Data

US 2014/0187232 A1    Jul. 3, 2014

(51) Int. Cl.
*H04M 3/42* (2006.01)
*H04W 4/20* (2009.01)
*H04W 84/02* (2009.01)
*H04W 84/18* (2009.01)

(52) U.S. Cl.
CPC ............. *H04W 4/20* (2013.01); *H04W 84/02* (2013.01); *H04W 84/18* (2013.01)

(58) Field of Classification Search
CPC ... H04W 52/052; H04W 84/02; H04W 84/12; H04W 92/00; H05B 37/0245; H05B 37/0272; H05B 37/0281

USPC .................... 455/418, 419, 420, 151.1, 153.2
See application file for complete search history.

(56) References Cited

U.S. PATENT DOCUMENTS

| | | | |
|---|---|---|---|
| 2007/0222581 A1 | 9/2007 | Hawkins et al. | |
| 2008/0143493 A1* | 6/2008 | Nam et al. | 340/310.11 |
| 2009/0243517 A1 | 10/2009 | Verfuerth et al. | |
| 2010/0029268 A1* | 2/2010 | Myer et al. | 455/426.1 |
| 2010/0271178 A1 | 10/2010 | Ahmad | |
| 2012/0037725 A1* | 2/2012 | Verfuerth | 239/289 |
| 2012/0040606 A1* | 2/2012 | Verfuerth | 455/7 |
| 2012/0080944 A1* | 4/2012 | Recker et al. | 307/25 |
| 2012/0312874 A1 | 12/2012 | Jonsson | |
| 2013/0013091 A1* | 1/2013 | Cavalcanti et al. | 700/90 |
| 2013/0278146 A1* | 10/2013 | Wilsher et al. | 315/151 |

OTHER PUBLICATIONS

PCT International Search Report and Written Opinion of PCT/US2013/078270, May 1, 2014, pp. 1-8.

* cited by examiner

*Primary Examiner* — Jean Gelin

(57) ABSTRACT

The present disclosure is directed to a photo controller. In one embodiment, the photo controller includes a central processing unit (CPU), a local area connection (LAN) interface in communication with the CPU, a wide area network (WAN) interface in communication with the CPU and an electrical power control component in communication with the CPU to control a lighting device.

20 Claims, 3 Drawing Sheets

LIGHTING CONTROLLER WITH INTEGRATED WIDE AREA NETWORK INTERFACE

BACKGROUND

Currently deployed network based lighting control systems require a special communications bridge or gateway device to be installed within communications range of a lighting controller on a lighting device to bridge between a local area network (LAN) and a wide area network (WAN). The lighting controllers typically are only equipped with LAN communications capability and require the special communications bridge or gateway device to reach the WAN.

However, many problems exist with trying to deploy a special communications bridge or gateway near the lighting devices. One problem is finding real estate to deploy the gateway may be difficult. For example, there may be no place to deploy the communications bridge or gateway on the ground or attached to existing structures in busy cities or the cost of buying or leasing real estate or attachment space may be prohibitive. A further problem is when attempting to install this equipment on existing structures requires impact studies. This may be the case of pole mounted equipment attached to the side of an existing structure. For example, mounted equipment may interfere with the initial manufacturing specifications of the existing structure (e.g., a pole) and create a hazard with regard to the change in wind loading on the pole profile. In addition, maintaining and installing the special communications bridge or gateway requires a high number of man hours and associated costs.

SUMMARY

In one embodiment, the present disclosure provides a photo controller. In one embodiment, the photo controller includes a central processing unit (CPU), a local area connection (LAN) interface in communication with the CPU, a wide area network (WAN) interface in communication with the CPU and an electrical power control component in communication with the CPU to control a lighting device.

In one embodiment, the present disclosure provides a method for controlling a plurality of lighting devices. In one embodiment, the method includes receiving at a wide area network (WAN) interface of a photo controller directly coupled to one of the plurality of lighting devices a control signal over a WAN from a server and forwarding the control signal to a remaining one or more of the plurality lighting devices via a local area network (LAN) interface of the lighting controller.

In one embodiment, the present disclosure provides a lighting control communications network. In one embodiment, the lighting control communications network includes a plurality of lighting devices, wherein each one of the plurality of lighting devices comprises a photo controller having only a local area network (LAN) interface, a main lighting device comprising a photo controller having a LAN interface and a wide area network (WAN) interface, wherein each one of the plurality of lighting devices is in communication with the main lighting device via the LAN interface and a server in communication with the main lighting device via the WAN interface.

BRIEF DESCRIPTION OF THE DRAWINGS

So that the manner in which the above recited features of the present disclosure can be understood in detail, a more particular description of the disclosure, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

DETAILED DESCRIPTION

As discussed above, currently deployed network based lighting control systems require a special communications bridge or gateway device to be installed within communications range of a lighting controller on a lighting device to bridge between a local area network (LAN) and a wide area network (WAN). The lighting controllers typically are only equipped with LAN communications capability and require the special communications bridge or gateway device to reach the WAN.

One embodiment of the present disclosure avoids the costs and complications associated with trying to deploy the special communications bridge or gateway device. In one embodiment, a photo controller (broadly a lighting controller) having LAN and WAN capability is provided. Notably, the novel photo controller of the present description provides a plug and play solution to allowing a lighting device to directly communicate with the WAN without the need to first communicate with a special communications bridge or gateway device.

Figure 1:
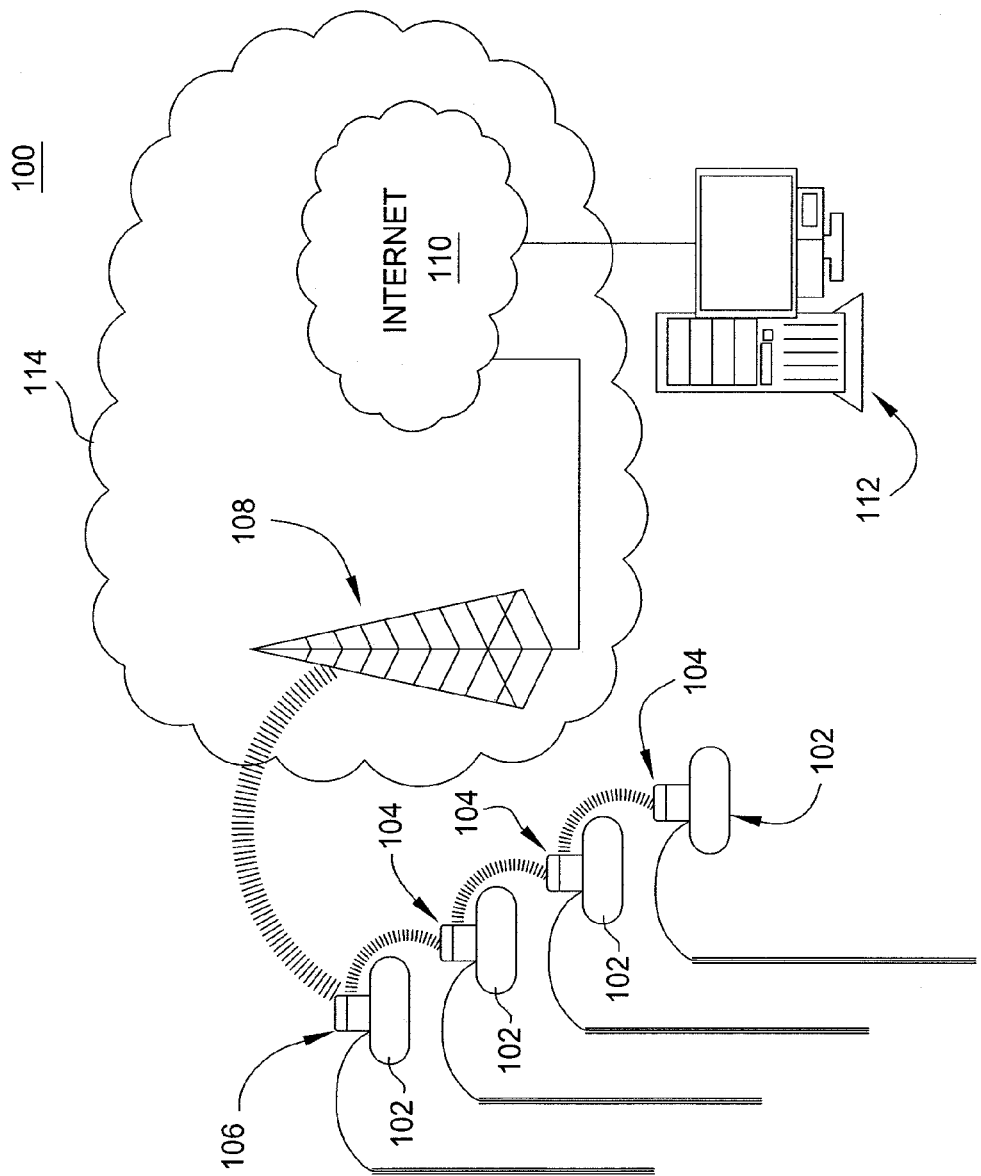
FIG. 1 depicts one embodiment of an example lighting control communications network.

FIG. 1 illustrates a high level block diagram of one embodiment of a lighting control communications network 100. In one embodiment, the network 100 includes one or more lighting devices 102, a WAN 114 and a server 112.

In one embodiment, the one or more lighting devices 102 may be a street light, a billboard light, an outdoor lamp, a ballast, and the like. In one embodiment, the one or more lighting devices 102 may be a light emitting diode (LED) based lighting device, e.g., an LED street light.

In one embodiment, one or more of the one or more lighting devices 102 (e.g., a subset of the one or more lighting devices 102), may include a photo controller 104 (broadly a lighting controller) that is equipped with only a LAN interface. In other words, the photo controllers 104 are only capable of communicating locally with other photo controllers 104 or a photo controller 106 that have a LAN interface. In other words, the photo controllers 104 cannot communicate with the WAN 114.

In one embodiment, a single one of the one or more lighting devices 102 (e.g., also referred to as a "main" lighting device, a "jump-off" lighting device, and the like) may be include a photo controller 106 having a LAN interface and a WAN interface. In other words, the photo controller 106 may be capable of communicating directly with the WAN 114 without the need to first communicate with a nearby bridge or gateway and, therefore, provide control to one or more of the plurality of lighting devices 102.

Notably, by providing a novel photo controller 106 having a LAN interface and a WAN interface, the problem of finding and paying for real estate to deploy a special communications bridge or gateway is eliminated. In addition, the photo controller 106 may be a plug and play solution that directly couples to the light device 102. In other words, the photo controller 106 may be an external device that may be independent of and separate from the lighting device 102. Said another way, the photo controller 106 is not an internal or integral part of the lighting device 102, but rather, a plug and play device that is coupled to the lighting device 102. As a result, the complications and man hours required to install the bridge or gateway is also eliminated. In addition, the novel photo controller 106 may replace the existing photo controller and, therefore, not add additional equipment to the lighting pole specifications.

In one embodiment, the WAN 114 may include a WAN base station 108 and a core network, e.g., the Internet 110 in one embodiment. The WAN 114 may be a cellular network (e.g., a code division multiple access (CDMA) network, a wideband CDMA (WCDMA) network a global system for mobile (GSM) communications network, a 3G network, a 4G network, a long term evolution (LTE) network, and the like). The WAN base station 108 may be, for example, a cellular tower.

In one embodiment, the server 112 may be a remotely located control and monitoring server. The server 112 may be located at a geographically remote location from the one or more lighting devices 102 and can be used to monitor and control each one of the lighting devices 102. For example, the server 112 may communicate a control signal to the photo controller 106 directly and the control signal may then be forwarded to one of the other lighting devices 102 via the LAN interfaces on the photo controllers 104 and 106. Alternatively, the photo controller 106 may directly provide monitoring information to the server 112. In other words, the photo controller 106 may provide a two-way communications directly with the server 112 without the need of a special communications bridge or controller.

In one embodiment, the server 112 may include a processor, a computer readable medium (e.g., a hard disk drive, random access memory (RAM), read only memory (ROM), removable disk drive, a solid state hard drive, and the like) and one or more input/output devices (e.g., a display, a keyboard, a mouse, and the like). The computer readable medium may be non-transitory, physical and/or tangible.

Figure 2:
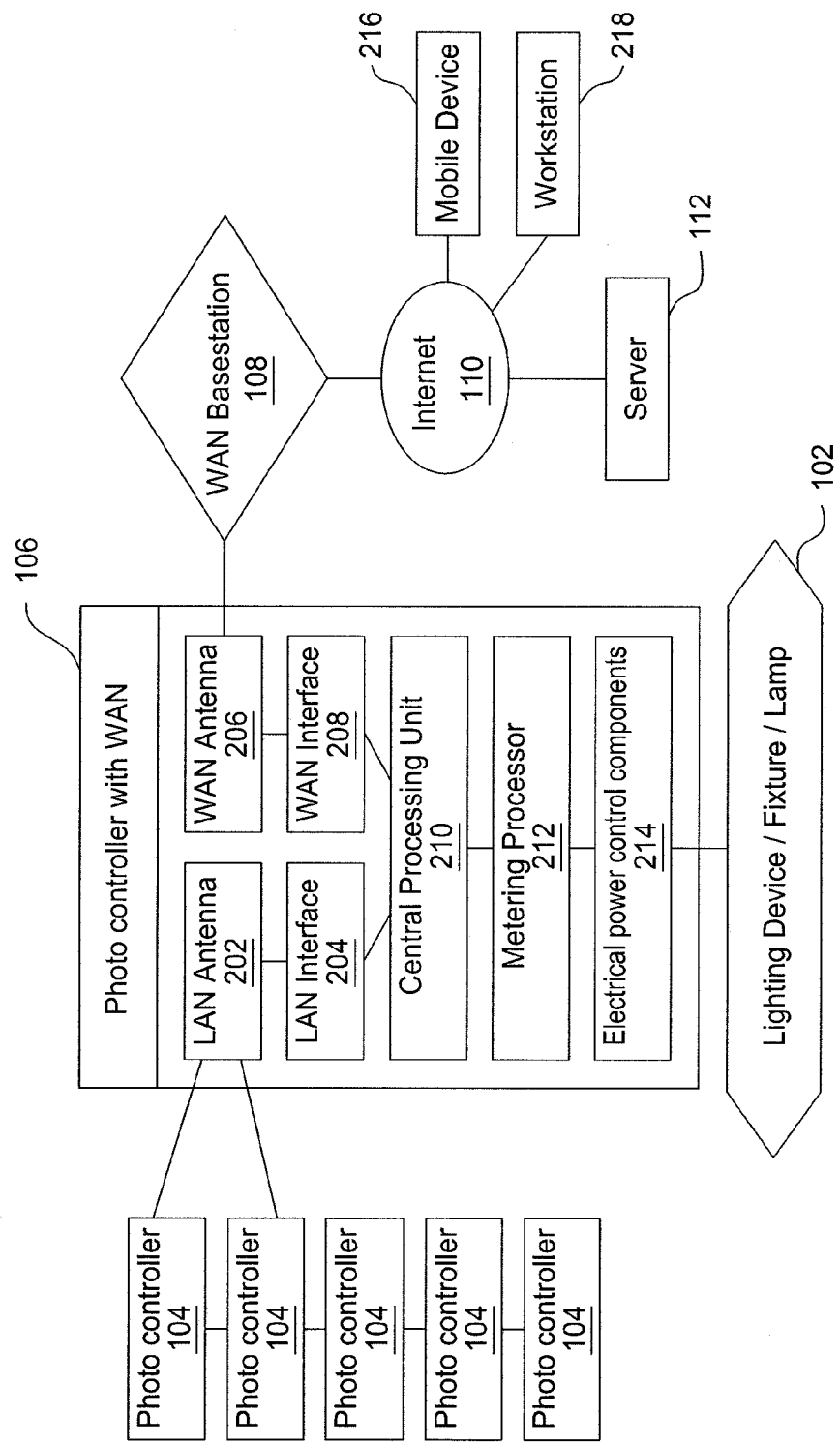
FIG. 2 depicts a block diagram of a photo controller having a wide area network (WAN) interface.

FIG. 2 illustrates a more detailed block diagram of the photo controller 106. In one embodiment, the photo controller 106 may include a LAN antenna 202 and a LAN interface 204 for LAN communications and WAN antenna 206 and a WAN interface 208 for WAN communications. In one embodiment, the LAN interface 204 and the WAN interface 208 may be in communications with a central processing unit (CPU) 210. The CPU 210 may be in communication with a metering processor 212, which may be in communication with the electrical power control components 214. The configuration of the various hardware components as shown in FIG. 2 is only illustrative.

The photo controller 106 may be directly coupled to the lighting device 102. The photo controller 106 may have a plug and play connection to provide ease of installation with the lighting device 102. The photo controller 106 may be used to control the lighting device 102. The WAN antenna 206 and the WAN interface 208 provide the ability for the server 112 to directly communicate control signals to the photo controller 106 or the ability of the photo controller 106 to directly provide information about the light device 102 to the server 112 without having to relay the control signals via a special communications bridge or gateway. Said another way, the photo controller 106 may communicate directly with the WAN 114 (e.g., the photo controller 106 may communicate directly with the WAN base station 108) such that a bridge or gateway is by-passed when sending information or receiving control signals to and from the server 112.

In addition, only a single lighting device 102 within a demarcated group or mesh of lighting devices 102 is required to be coupled to the photo controller 106. As a result, only a single "subscription" fee for communications may be required if the WAN 114 is a cellular network requiring a monthly subscription or service fee. The remaining lighting devices 102 having a photo controller 104 with only a LAN interface may communicate locally with the photo controller 106 and allow the photo controller 106 to forward monitoring information or control signals between the photo controllers 104 and the server 112.

In one embodiment, the control signals may include, for example, on/off functionality, control of light intensity, scheduling information, a color mixing code, and the like. In one embodiment, the monitoring information may include, for example, power metering information, temperature information, diagnostic information, and the like.

Figure 3:
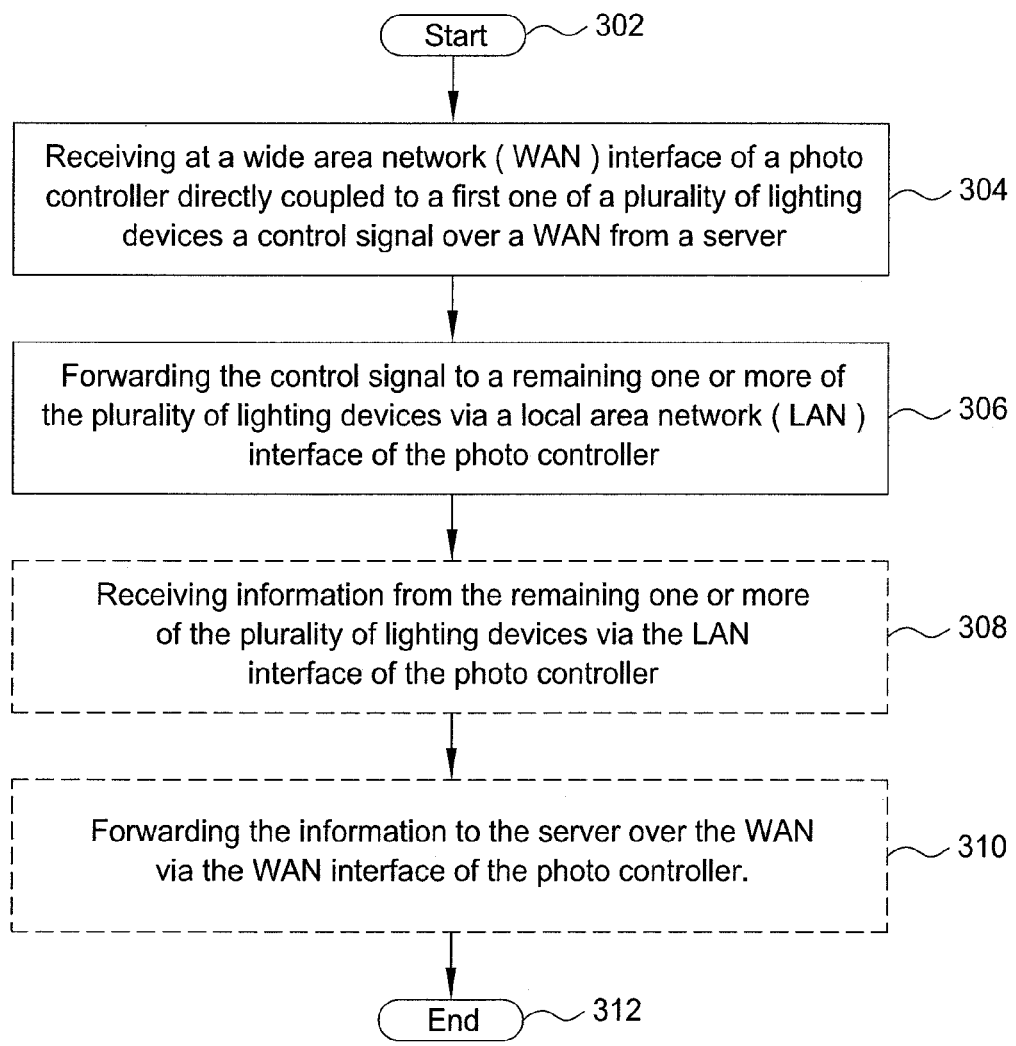
FIG. 3 depicts an example flow diagram of a method for controlling a plurality of lighting devices.

FIG. 3 illustrates an example flowchart of one embodiment of a method 300 for controlling a plurality of lighting devices. In one embodiment, the steps, functions, or operations of the method 300 may be performed by the photo controller 106.

The method 300 begins at step 302. At step 304, the method 300 receives at a WAN interface of a photo controller directly coupled to a first one of a plurality of lighting devices a control signal over a WAN from a server. In one embodiment, the server may be located remotely from the lighting device having the photo controller with the WAN interface. In one embodiment, the control signals may include, for example, on/off functionality, control of light intensity, scheduling information, a color mixing code, and the like.

In one embodiment, the WAN may be a cellular network that provides services to the photo controller 106. For example, a subscription fee may be paid to provide cellular services for the WAN interface of the photo controller. Notably, only a single subscription fee needs to be paid for the service of the WAN interface. In other words, a subscription fee need not be paid for each one of the plurality of lighting devices.

It should be noted that the control signal is transmitted directly between the WAN and the photo controller. In other words, no bridge or gateway is located between the photo controller coupled to the lighting device and the WAN. In one embodiment, the lighting device may be an LED based street light.

At step 306, the method 300 forwards the control signal to a remaining one or more of the plurality of lighting devices, e.g., in a particular geographical area, via a LAN interface of the photo controller. A single lighting device may be coupled to a photo controller that has both a WAN interface and a LAN interface. All of the remaining lighting devices may be coupled to a photo controller that only has a LAN interface. The lighting devices may communicate with one another using the LAN interface, e.g., using a Zigbee® protocol. Thus, using the disclosed topology, the remaining lighting devices may communicate with the server via the photo controller having the WAN interface without the need of a bridge or gateway.

In one embodiment, the control signal may be addressed for a specific photo controller. For example, each photo controller of each one of the plurality of lighting devices may have a unique address or identifier. The control signal may be addressed to a particular photo controller, which may then control the associated lighting device in accordance with the control signal. Thus, the server may individually control each one of the plurality of lighting devices.

The method 300 may then perform optional steps 308 and 310. At optional step 308, the method 300 receives information from the remaining one or more of the plurality of lighting devices via the LAN interface of the photo controller. In one embodiment, the monitoring information may include, for example, power metering information, temperature information, diagnostic information, and the like.

At optional step 310, the method 300 may forward the information to the server over the WAN via the WAN interface of the photo controller. In one embodiment, the information may be requested by the server. Thus, the lighting control communications network of the present disclosure is a two-way communications. In other words, the information is not only "pushed" to the server on a periodic basis, but may also be "pulled" by the server as a request at any given time. The method 300 ends at step 312.

It should be noted that although not explicitly specified, one or more steps or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, operations, steps or blocks of the above described methods can be combined, separated, and/or performed in a different order from that described above, without departing from the example embodiments of the present disclosure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A photo controller, comprising:
a central processing unit (CPU);
a local area network (LAN) interface in communication with the CPU;
a wide area network (WAN) interface in communication with the CPU, wherein the WAN interface communicates directly with a WAN base station in a wide area network without first communicating with and by-passing a bridge or a gateway to receive a control signal and send monitoring information over a two-way communication path from a remote server for controlling a lighting device coupled to the photo controller, wherein the control signal comprises an on and off functionality of the lighting device, a control of a light intensity of the lighting device, scheduling information of the lighting device and a color mixing code of the lighting device, wherein the monitoring information comprises a power metering information of the lighting device, a temperature information of the lighting device and a diagnostic information of the lighting device; and
an electrical power control component in communication with the CPU to control the lighting device coupled to the photo controller in accordance with the control signal.

2. The photo controller of claim 1, wherein the photo controller is directly coupled to the lighting device.

3. The photo controller of claim 1, wherein the lighting device comprises a street light.

4. The photo controller of claim 1, wherein the lighting device comprises a light emitting diode (LED) based lighting device.

5. The photo controller of claim 1, wherein the LAN interface is in communication with a different lighting controller associated with each one of a different plurality of lighting devices.

6. The photo controller of claim 1, wherein the WAN interface is in communication with a server that is remotely located.

7. The photo controller of claim 6, wherein the WAN interface communicates with the server over a cellular network.

8. The photo controller of claim 1, wherein the LAN interface communicates using a Zigbee protocol.

9. A method for controlling a plurality of lighting devices, comprising:
receiving, at a wide area network (WAN) interface of a photo controller directly coupled to one of the plurality of lighting devices, a control signal to control another one of the plurality of lighting devices over a wide area network from a server, wherein the WAN interface communicates directly with a WAN base station in the WAN without first communicating with and by-passing a bridge or a gateway when receiving the control signal and when sending monitoring information over a two-way communication path from the server, wherein the control signal comprises an on and off functionality of the lighting device, a control of a light intensity of the lighting device, scheduling information of the lighting device and a color mixing code of the lighting device;
forwarding the control signal to a remaining one or more of the plurality lighting devices via a local area network (LAN) interface of the photo controller until the control signal reaches the another one of the plurality of lighting devices that the control signal is to control;
receiving the monitoring information from the another one of the plurality of lighting devices, wherein the monitoring information comprises a power metering information of the lighting device, a temperature information of the lighting device and a diagnostic information of the lighting device; and
sending the monitoring information to the server via the WAN interface.

10. The method of claim 9, wherein the WAN comprises a cellular network.

11. The method of claim 9, wherein the LAN interface communicates via a Zigbee protocol.

12. The method of claim 9, wherein the control signal comprises at least one of: an on/off command, a light intensity command, a scheduling information or a color mixing code.

13. The method of claim 9, wherein each one of the plurality of light devices comprises a street light.

14. The method of claim 9, wherein each one of the plurality of lighting devices comprises a light emitting diode (LED) based lighting device.

15. The method of claim 9, wherein the server is remotely located from the first one of the plurality of lighting devices.

16. The method of claim 9, further comprising:
receiving information from the remaining one or more of the plurality of lighting devices via the LAN interface of the photo controller; and
forwarding the information to the server over the WAN via the WAN interface of the photo controller.

17. The method of claim 16, wherein the information comprises at least one of: power metering information, temperature information or diagnostic information.

18. A lighting control communications network, comprising:
- a plurality of lighting devices, wherein each one of the plurality of lighting devices comprises a photo controller having only a local area network (LAN) interface;
- a main lighting device comprising a photo controller having a LAN interface and a wide area network (WAN) interface, wherein each one of the plurality of lighting devices is in communication with the main lighting device via the LAN interface; and
- a server in communication with the main lighting device via the WAN interface via two way communication path, wherein the WAN interface communicates a control signal for controlling one of the plurality of lighting devices directly with a WAN base station in a wide area network without first communicating with and by-passing a bridge or a gateway when communicating with the server and receives a monitoring information via the WAN base station, wherein the control signal comprises an on and off functionality of the lighting device, a control of a light intensity of the lighting device, scheduling information of the lighting device and a color mixing code of the lighting device, wherein the monitoring information comprises a power metering information of the lighting device, a temperature information of the lighting device and a diagnostic information of the lighting device.

19. The lighting control communications network of claim 18, wherein the WAN comprises a cellular network.

20. The lighting control communications network of claim 18, wherein the LAN interface communicates via a Zigbee protocol.

* * * * *